US008355936B2

(12) United States Patent
Altaf et al.

(10) Patent No.: US 8,355,936 B2
(45) Date of Patent: Jan. 15, 2013

(54) MANAGING A TRAVEL ITINERARY

(75) Inventors: Faheem Altaf, Pflugerville, TX (US);
Kumar Ravi, Cedar Park, TX (US); Eric Siegfried Rybczynski, Round Rock, TX (US); Manuel Silveyra, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 12/054,571

(22) Filed: Mar. 25, 2008

(65) Prior Publication Data
US 2008/0177584 A1 Jul. 24, 2008

Related U.S. Application Data

(63) Continuation of application No. 11/032,261, filed on Jan. 10, 2005, now abandoned.

(51) Int. Cl.
*G06Q 10/00* (2012.01)
(52) U.S. Cl. .......................................................... 705/5
(58) Field of Classification Search .................. 705/5
See application file for complete search history.

(56) References Cited

U.S. PATENT DOCUMENTS

| | | | |
|---|---|---|---|
| 5,006,983 A | 4/1991 | Wayne et al. | |
| 6,112,185 A | 8/2000 | Walker et al. | |
| 6,119,095 A | 9/2000 | Morita | |
| 6,249,767 B1 * | 6/2001 | Okayama et al. | 705/5 |
| 6,477,520 B1 | 11/2002 | Malaviya et al. | |
| 6,496,568 B1 | 12/2002 | Nelson | |
| 6,658,093 B1 | 12/2003 | Langseth et al. | |
| 6,898,569 B1 * | 5/2005 | Bansal et al. | 705/7.16 |
| 7,231,355 B2 * | 6/2007 | Schoen et al. | 705/1.1 |
| 2002/0016724 A1 | 2/2002 | Yang et al. | |
| 2003/0004776 A1 * | 1/2003 | Perrella et al. | 705/9 |
| 2003/0034958 A1 * | 2/2003 | Waesterlid et al. | 345/158 |
| 2004/0019606 A1 | 1/2004 | Ackerman et al. | |
| 2004/0260466 A1 * | 12/2004 | Ichihara et al. | 701/209 |
| 2005/0215247 A1 * | 9/2005 | Kobylarz | 455/426.1 |
| 2006/0059024 A1 * | 3/2006 | Bailey et al. | 705/5 |
| 2006/0155591 A1 | 7/2006 | Altaf et al. | |
| 2006/0277078 A1 * | 12/2006 | Ohmori et al. | 705/5 |

OTHER PUBLICATIONS

Rosato, D., "Airlines Push for Punctuality Carriers Chart Creative Course to Fewer Delays," USA Today, Final Edition, Dec. 10, 1997, pp. 01-01B.*

(Continued)

*Primary Examiner* — Nathan Erb
(74) *Attorney, Agent, or Firm* — Stephen J. Walder, Jr.; Matthew B. Talpis

(57) ABSTRACT

Mechanisms for managing a travel itinerary of a user are disclosed. More particularly, hardware and/or software for managing the user's travel itinerary based on the location of the user are disclosed. Embodiments may include receiving user location information and estimating the arrival time of the user at the departure point for a scheduled first trip of the user based on the user location information. Embodiments may also include comparing the estimated arrival time of the user at the destination with a departure time for the scheduled first trip and, if the arrival time is substantially earlier than the departure time or equal to or later than the departure time, rescheduling by the travel itinerary computer the user for a different second trip. Further embodiments may include transmitting notification to the user that he has been rescheduled to a second trip.

18 Claims, 5 Drawing Sheets

OTHER PUBLICATIONS

"Route Planning Software from ROUTE 66," http://site4.co.uk/acatalog/Route_Planning_Software_from_Route_66.html, Sep. 22, 2004, 3 pages.

"Essential Travel Information", http://www.virtuallythere.com., Sep. 22, 2004, 1 page.

Travel Manager, "To See the Future of Online Registration and Housing, Call Us Today", http://www.conference.com/software/travelmgr.html, Apr. 22, 2004, 1 page.

U.S. Appl. No. 11/032,261.

* cited by examiner

MANAGING A TRAVEL ITINERARY

CROSS-REFERENCES TO RELATED APPLICATIONS

Pursuant to 35 USC §120, this continuation application claims priority to and benefit of U.S. patent application Ser. No. 11/032,261, entitled "SYSTEMS, METHODS, AND MEDIA FOR MANAGING A TRAVEL ITINERARY", filed on Jan. 10, 2005, now abandoned the disclosure of which is incorporated herein in its entirety for all purposes.

FIELD OF INVENTION

The present invention is in the field of computer systems. More particularly, the present invention relates to systems, methods and media for managing a travel itinerary, particularly for managing the travel itinerary based on the location of a user with a wireless device.

BACKGROUND

As air travel and other types of travel have become ubiquitous, the complexity of travel arrangements has dramatically increased. Travel schedules have become increasingly confusing because of complicated connections, hub-and-spoke travel systems, flight changes, and weather delays. Many uncertainties face a passenger desiring to make a flight from her local airport. Highway traffic may cause the passenger being late for her flight. Long lines at the check-in counter, baggage drop-off, or security checkpoint often result in a passenger missing her flight. If a passenger misses, her flight, it can have repercussions on her entire travel schedule, as connections are missed and people planning to pick her up at her destination are left waiting. Many factors contribute to a passengers missing her flight and the consequences of missed flights in terms of lost time, lost money, lost revenue for the airline, decreased customer satisfaction, and increased stress can be severe. To assist passengers, some airlines and other providers provide electronic notifications to a passenger's wireless device when flights are changed are delayed. This does not, however, allow for a passenger's, itinerary to be changed.

Because so many factors can result in a passenger missing her flight, many passengers leave for the airport (or other travel hub) early so that she has additional time to accommodate delays. In circumstances where these delays do not happen, the passenger often arrives at her gate early. In many cases, the passenger often does not realize that seats on other flights may be available to her destination and accordingly does not seek out those flights and instead simply checks into her original flight. Many airlines are willing to accommodate passengers who desire to fly on an earlier flight, but the passenger typically needs to make a special request to do so. While a helpful representative may be able to suggest an earlier flight, this adds additional work on an already overburdened ground crew. This problem is exacerbated on busy travel days or at heavily-used airports. As this solution requires customer service representative time and is only somewhat effective, as many passengers do not even realize that such an option exists, this is an unsatisfactory solution. Because most passengers do not change their booking to an earlier available flight, passengers often waste time in the airports, seats on the aircraft go underutilized, and passengers become subject to any delays on later flights.

A passenger who misses her flight must contact a customer service representative of the airline in order to book a hew flight. This process can be very time consuming and frustrating, as customer service representatives are typically overburdened and may be inconveniently located. Also, in some cases, customer service representatives may automatically rebook a passenger on a later flight without notifying the passenger or others waiting to pick up the passenger.

There is, therefore, a need for an efficient and effective mechanism for managing the travel itinerary of a user, particularly for passengers with scheduled service on a common carrier such as an airline. There is an even greater need for such a mechanism when a passenger is likely to be late or substantially earlier for her travel.

SUMMARY

The problems identified above are in large part addressed by systems, methods and media for managing a travel itinerary of a user. One embodiment generally includes receiving by a travel itinerary computer user location information from the user on the wireless device, where the user location provides an indication of the user's location, and estimating by the travel itinerary computer the arrival time of the user at the departure point for a scheduled first trip of the user, where the estimation is based on the user location information. The method also generally includes comparing by the travel itinerary computer the estimated arrival time of the user at the destination with a departure time for the scheduled first trip and, if the arrival time is substantially earlier than the departure time or equal to or later than the departure time, rescheduling by the travel itinerary computer the user for a different second trip. A further embodiment provides for receiving supplementary information by the travel itinerary computer basing the estimation of the user's arrival time on the user's location and the supplementary information. An additional embodiment provides for rescheduling services by the travel itinerary computer based on the second trip.

Another embodiment provides a machine-accessible medium containing instructions effective, when executing in a data processing system, to cause the system to perform a series of operations for managing a travel itinerary of a user. The series of operations generally includes receiving by a travel itinerary computer user location information from the user on the wireless device, where the user location provides an indication of the user's location, and estimating by the travel itinerary computer the arrival time of the user at the departure point for a scheduled first trip of the user, where the estimation is based on the user location information. The series of operations also generally includes comparing by the travel itinerary computer the estimated arrival time of the user at the destination with a departure time for the scheduled first trip and, if the arrival time is substantially earlier than the departure time or equal to or later than the departure time, rescheduling by the travel itinerary computer the user for a different second trip.

A further embodiment provides a system for managing a travel itinerary for a user on a wireless device connected to a wireless network. The itinerary management system may generally include a user interaction module for receiving, user location information from the user and a travel time determiner for estimating the time for the user to travel to a departure point associated with a scheduled trip based on the user location information. The system may also generally include an itinerary manager for determining whether a user's; itinerary should be changed based on the estimated time for the user to travel to the departure point and for changing the user's itinerary by rescheduling a new trip to replace the user's scheduled trip. The system may also include, in some embodiments, a supplementary information interface for receiving or generating supplementary information and a services interface for requesting changes in scheduled service based on changes in the user's itinerary.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

Figure 1:
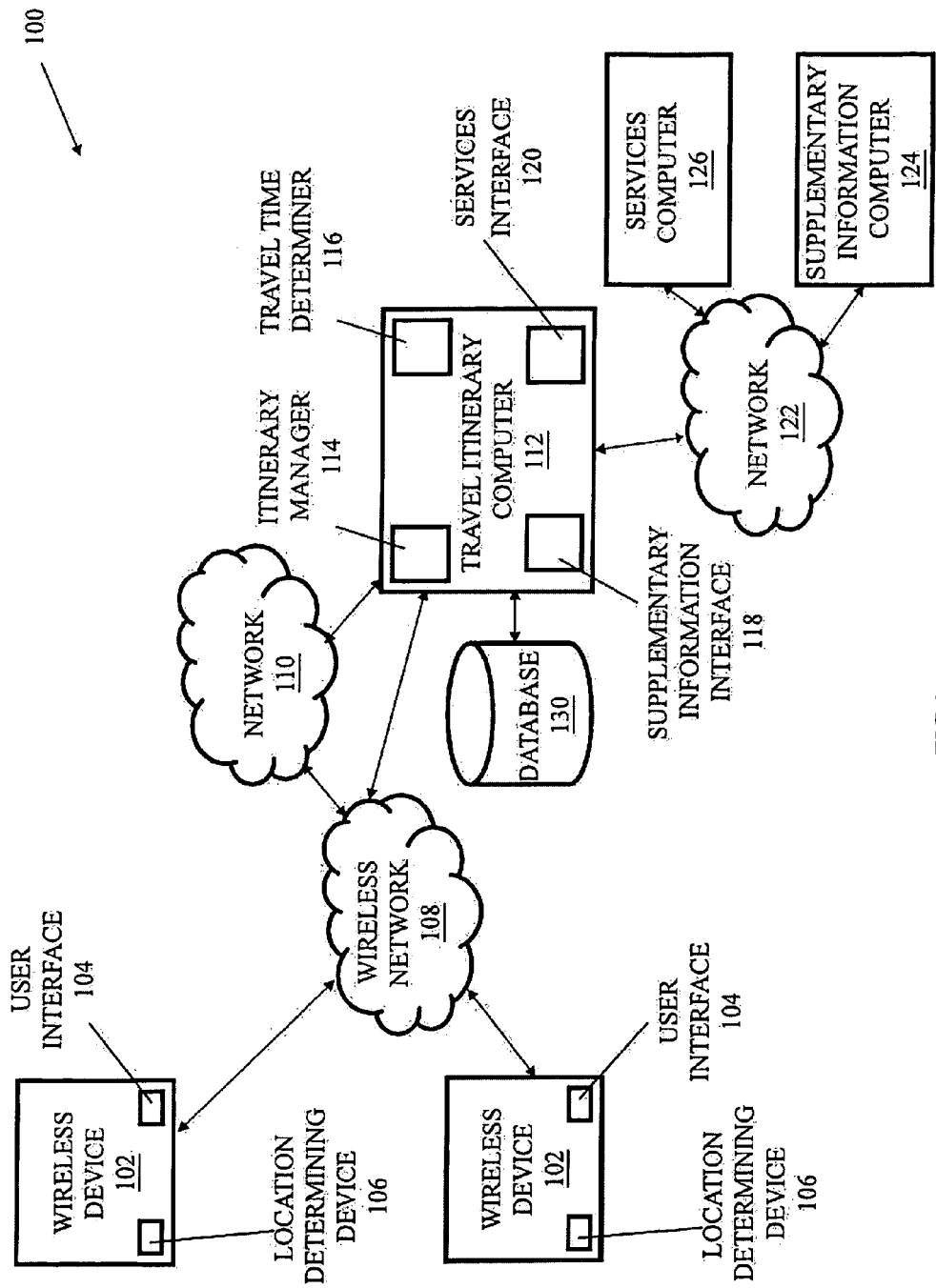
FIG. 1 depicts an environment for a system for managing a travel itinerary of a user according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for managing a travel itinerary of a user are disclosed. More particularly, hardware and/or software for managing the user's travel itinerary based on the location of the user are disclosed. Embodiments may include receiving user location information and estimating the arrival time of the user at the departure point for a scheduled first trip of the user based on the user location information. Embodiments may also include comparing the estimated arrival time of the user at the destination with a departure time for the scheduled first trip and rescheduling the user for a different second trip based on the comparison of the user's estimated arrival time and the departure time for the scheduled trip. Further embodiments may include transmitting notification to the user that he has been rescheduled to a second trip.

The disclosed embodiments provide a methodology and system whereby the itinerary of a user may be changed based on the user's location. By changing the itinerary of a user based on the user's current location and an estimate of how long it will take him to reach the starting point for his trip (such as to an airline gate), an efficient and effective method of accommodating early or late users is provided. For a user who is early for her flight, she may be automatically moved (or queried to see if she desires to move) to an earlier flight, resulting in the possibility of reducing her travel time to her ultimate destination and more efficiently filling a particular flight or other trip. For a user who will be late for her flight, she may be automatically moved (or queried to see if she desires to move) to a later flight that she can make in time, eliminating the need for those users to have to contact customer service representatives and wait in line again. For either of these changes, scheduled services such as rental cars or hotels may also be rescheduled, again eliminating the need for a user to do these tasks themselves. A user's location may be determined by a location determining system in some embodiments.

While specific embodiments will be described below with reference to particular configurations of hardware and/or software, those of skill in the art will realize that embodiments of the present invention may advantageously be implemented with other substantially equivalent hardware and/or software systems.

Turning now to the drawings, FIG. 1 depicts an environment for a system for managing a travel itinerary of a user according to one embodiment. In the depicted embodiment, itinerary management system 100 includes one or more wireless devices 102 in communication with a wireless network 108. Each wireless device 102 may include a user interface 104 to allow information to be displayed to a user of the wireless device 102 and to receive input from the user, as well as a location determining device 106 to assist in determining the location of the wireless device 102 (and thus the user) at a given time. Wireless network 108 may be in communication with the travel itinerary computer 112 either directly or via another network such as network 110. The travel itinerary computer 112 provides, in the depicted embodiment, a mechanism for receiving information from a user on a wireless device 102, including an indication of the user's on a wireless device's location, and determining whether the user's: itinerary should be changed based on the estimated time it will take the user to reach the beginning point of her travel. The travel itinerary computer 112 of the depicted embodiment includes an itinerary manager 114, a travel time determiner 116, a supplementary information interface 118, and a services interface 120. The itinerary manager 114 may determine whether the itinerary of the user should be changed based on information received from the travel time determiner 116, which may estimate the amount of time the user will need to reach the location necessary to make her flight or other travel. The travel time determiner 116 may also receive information from the supplementary information interface 118 to assist in estimating travel times. The services interface 120 may be used to facilitate rescheduling or arranging services for the user if the user's itinerary is changed.

The travel itinerary computer 112 may be in communication with a supplementary information computer 124 and a services computer 126 via a network 122 in one embodiment. The supplementary information computer 124 may provide information that may be used by the travel time determiner 116 to estimate travel times, such as information relating to traffic, airport conditions, weather conditions, and security lines. The services computer 126 may be any computer system that facilitates providing services to a user, such as rental cars, shuttle buses, or hotel reservations. If the travel itinerary computer 112 decides to change the user's itinerary, the travel itinerary computer 112 might also determine that other services also need to be changed and would therefore utilize the services computer 126. Optional database 130 may be in communication with the travel itinerary computer 112 for storage of user preferences, itinerary information, supplementary information or the like.

In itinerary management system 100, any of the travel itinerary computer 112, supplementary information computer 124, services computer 126, or database 130 may be located at the same location, such as in the same building; or computer lab, or could be remote. While the term "remote" is used with reference to the distance between the components of itinerary management system 100, the term is used in the sense of indicating separation of some sort, rather than in the sense of indicating a large physical distance between the systems. For example, any of the components of itinerary management system 100 may be physically adjacent or located as part of the same computer system in some network arrangements.

Wireless device 102 may include any device adapted to allow a user to communicate with a wireless network 108, including portable and mobile devices. Examples include mobile phones, cellular phones, wireless-enabled personal digital assistants (PDAs), notebook computers, tablet personal computers, portable computer systems; wireless-enabled pagers, automotive-based wireless devices, a Bluetooth-enabled devices or any wireless-enabled device. In the depicted embodiment, the wireless device 102 includes a user display 104 and a location determining device 106. The user interface 104 may include a display screen for displaying information to the user. Any apparatus for conveying information to the user, such as a printer or speaker, may alternatively be used. The user interface 104 may also include a user input device, such as any apparatus which accepts input from a user, such as buttons, dials, keys, keypad, levers, a voice recognition device, or a device for accepting optical input.

The location determining device 106 may include hardware and/or software adapted to determine its present location and thus serves the present location of the wireless device 102 and the user. The location determining device 106 may be a conventional global positioning system ("GPS") receiver integrated into the wireless device 102. Alternatively, location determining device 106 may be an add-on or aftermarket GPS receiver adapted to be connected to wireless device 102. In an alternative embodiment, other wireless location determining methodologies may be used for the location determining device 106, such as utilization of an Assisted Global Positioning System (A-GPS) receiver, or inertial measurement units. In another alternative embodiment, the wifeless device 102 need not have a location determining device 106 at all and the user's location may instead be determined via other means, such as other parameters of the wireless signal, such as signal strength, angle-of-arrival (AOA), time-of-arrival (TOA), Uplink Time Difference of Arrival (U-TDOA), Cell Identification (CID), Enhanced CID (E-CID), multipath profile or other characteristics. Any appropriate type of location determining methodology may be used, including combinations of the above methodologies.

Wireless network 108 may be any type of wireless network, such as a cellular network or Bluetooth-based network. Network 110 may be any type of data communications channel, such as the Internet, an intranet, a LAN, a WAN, an Ethernet network, or a wireless network. In one embodiment, the wireless device 102 may communicate with a base station as part of the wireless network 108, which in turn may be in communication with a mobile switching center, gateway mobile switching center (GMSC), or other elements of a wireless or cellular network 110. In another embodiment, wireless network 108 may communicate with a telephone network 110 (or other wireless or cellular networks) via a GMSC. The wireless network 108, in one embodiment, communicates with the Internet or other network 110 using the Wireless Access Protocol (WAP) via a WAP gateway, which translates between the protocols of the World Wide Web (WWW) and the WAP protocols of some wireless devices 102. Those skilled in the art will recognize, however, that types of data communication channels between the wireless device 102 and the travel itinerary computer 112 may be used without departure from the scope and spirit of the invention.

Travel itinerary computer 112 provides for management of a user's itinerary based on a number of factors, including the location of the user on the Wireless device 102. The travel itinerary computer 112 may be one or more of any type of computer system, including servers, personal computers, workstations, mainframe computers, notebook or laptop computer, desktop computers, or the like. In one embodiment, the travel itinerary computer 112 is an IBM® eServer or similar server having one or more processors, or threads of processors, executing software and/or one or more state machines coupled with data storage devices such as random access memory (RAM), read only memory (ROM), flash memory, compact disk drives, hard drives, and the like. The travel itinerary computer 112 may be in communication with (or include) a database 130 for storage of user information or itinerary information.

The itinerary manager 114 of the travel itinerary computer 112 may determine whether the itinerary of the user should be changed. The itinerary manager 114 may use a variety of types of information to make its determination, such as an estimated time for the user to reach the beginning point for her journey as provided by the travel time determiner 116. Other, types of information the itinerary manager 114 may use includes scheduled departure times for the user's scheduled trip, scheduled departure times for alternative trips, scheduled departure and arrival times for connecting trips, user specified preferences, weather conditions, the existence of other reservations for services; air traffic conditions, passenger loads on particular flights, or the like. If a user's estimated time of arrival at the location she needs to be for her scheduled trip is equal to or later than the latest time the user is permitted to arrive (such as when a plane is pulling away from the gate or when the gate closes) or other deadline, the itinerary manager 114 may then change the user's itinerary to another trip at a later time. In making the change to another flight, the itinerary manager 114 may take into consideration how long it would take the user to travel to the right spot for that flight (such as a gate in a different terminal) so that the new itinerary is acceptable to the user. Similarly, if a user's estimated time of arrival at the location she needs to be for her scheduled trip is substantially earlier than the departure time, the itinerary manager 114 may then change her itinerary to the earlier trip. The itinerary manager 114 may consider the time it may take to get to the correct location for the new trip as well. An estimated time of arrival may be considered substantially earlier if it is sufficiently early enough so that the user's estimated time of arrival at the correct location of the new, second trip allows the user to make that trip. For example, if a user is estimated to be two hours early for their scheduled trip, the user would be substantially early for a second trip that leaves from the same location one hour earlier. In another example, if a user is estimated to be 30 minutes early for a trip and a second trip scheduled for 15 minutes earlier from another location is available, the user would only be substantially early if the estimated travel time to the second trip departure location was less than 15 minutes (and she was thus sufficiently early to make the second trip).

The travel time determiner 116 may estimate the amount of time the user will need to reach the location necessary to make her trip, flight or other travel arrangement, including scheduled trips for the user as well as possible second trips for the user. The travel time determiner 116 may also receive information from the supplementary information interface 118 to assist in estimating travel times. The travel time determiner 116 may use a wide variety of factors in order to estimate the travel time of the user. One typical factor would be the distance necessary to travel and a time associated with that distance. For instance, if a user had to walk 800 yards in an airport terminal, the travel time determiner 116 may estimate that it will take the user 10 minutes to traverse that distance. This may be based on historical data for all users, for the particular user, for that airport, for that particular segment (for example, it takes 10 minutes to get from Gate A1 to B2), or any means of estimating time. In another example, the estimated time may be based on the user's current rate of travel; a user traveling at 50 miles per hour can reasonably be expected to travel 25 miles in half of that time. Rate of travel, in one embodiment, may be extrapolated from location data over time. Another factor the travel time determiner 116 may use includes any known delays in the user's expected path. Known delays may include traffic backups, security line delays, check-in times at the airport, luggage check-in, airport transporter delays, and the like. Current information about known delays may be received from a supplementary information computer 124 or delays may be based on historical trends.

The supplementary information interface 118 may facilitate communication between a supplementary information computer 124 and the travel itinerary computer 112 so that the travel time determiner 116 receives relevant supplementary information. Similarly, the services interface 120 may assist rescheduling or arranging services for the user if the user's itinerary is changed by facilitating communication between a services computer 126 and the travel itinerary computer 112. In one embodiment, travel itinerary computer 112 may connect to a supplementary information computer 124 and/or a services computer via a network 122. Network 122 may be any type of data communications channel, such as the Internet, an intranet, a LAN, a WAN, an Ethernet network, or a wireless network. In one embodiment, network 122 is a separate network than network 110 of wireless network 108, but in other embodiments, network 122 and network 110, for example, may be equivalent.

The supplementary information computer 124, in one embodiment, provides information that may be used by the travel time determiner 116 to estimate travel times, such as information relating to traffic, airport conditions, weather conditions, security lines, of the like. The information supplied by the supplementary information computer 124 may be located local to the supplementary information computer 124 of it may be retrieved from other sources, such as traffic information sites, weather information sites, or similar sources. The supplementary information computer 124 may provide real-time data about current conditions (whether supplied locally or remotely), data based on historical data, or a combination of the two. In an alternative embodiment, some or all of the functions of the supplementary information computer 124 may be provided by the travel itinerary computer 112, potentially making the supplementary information computer 124 unnecessary.

The services computer 126, in one embodiment, facilitates providing services to a user, such as rental cars, shuttle buses, or hotel reservations. Other potential services include restaurant reservations, limousine service, tickets for a train or other transportation, entertainment tickets (such as shows or plays), or any other type of service. In one embodiment, the services computer 126 may reschedule any of these services to accommodate a change in the user's itinerary. For example, if a user was delayed to a flight that arrives three hours later, the services computer 126 may then reschedule or cancel dinner reservations, eliminating the need for the user to do so. In another example, if a, user was rescheduled for an earlier flight, the services computer 126 may arrange for an earlier pick-up by a shuttle service. The services computer 126 may make its own determination of whether to change services after receiving notification of an itinerary change from the travel itinerary computer 112 or it may receive instructions from a travel itinerary computer 112 to modify services (and possibly instructions on how to modify them). In an alternative embodiment, some or all of the functions of the services computer 126 may be provided by the travel itinerary computer 112, potentially making the services computer 126 unnecessary.

The disclosed embodiments of the itinerary management system 100 provide an efficient and effective way of managing the travel itinerary of a user. If a user will be likely be late for a scheduled, trip, based on the user's location and the estimated time it will take them to reach her gate or other travel start point, the itinerary management system 100 may automatically reschedule her trip to a later one. This helps alleviate a burden and stress on the user, in addition to saving the user time and hassle. If a user is early for her scheduled trip and will likely be able to catch an earlier trip, the itinerary management system 100 may automatically reschedule her trip to the earlier one, allowing the user to spend less time traveling with little effort on her part. In both of these scenarios, the itinerary management system 100 may be modified in light of the changed itinerary, providing additional convenience and benefit to the user.

Figure 2:
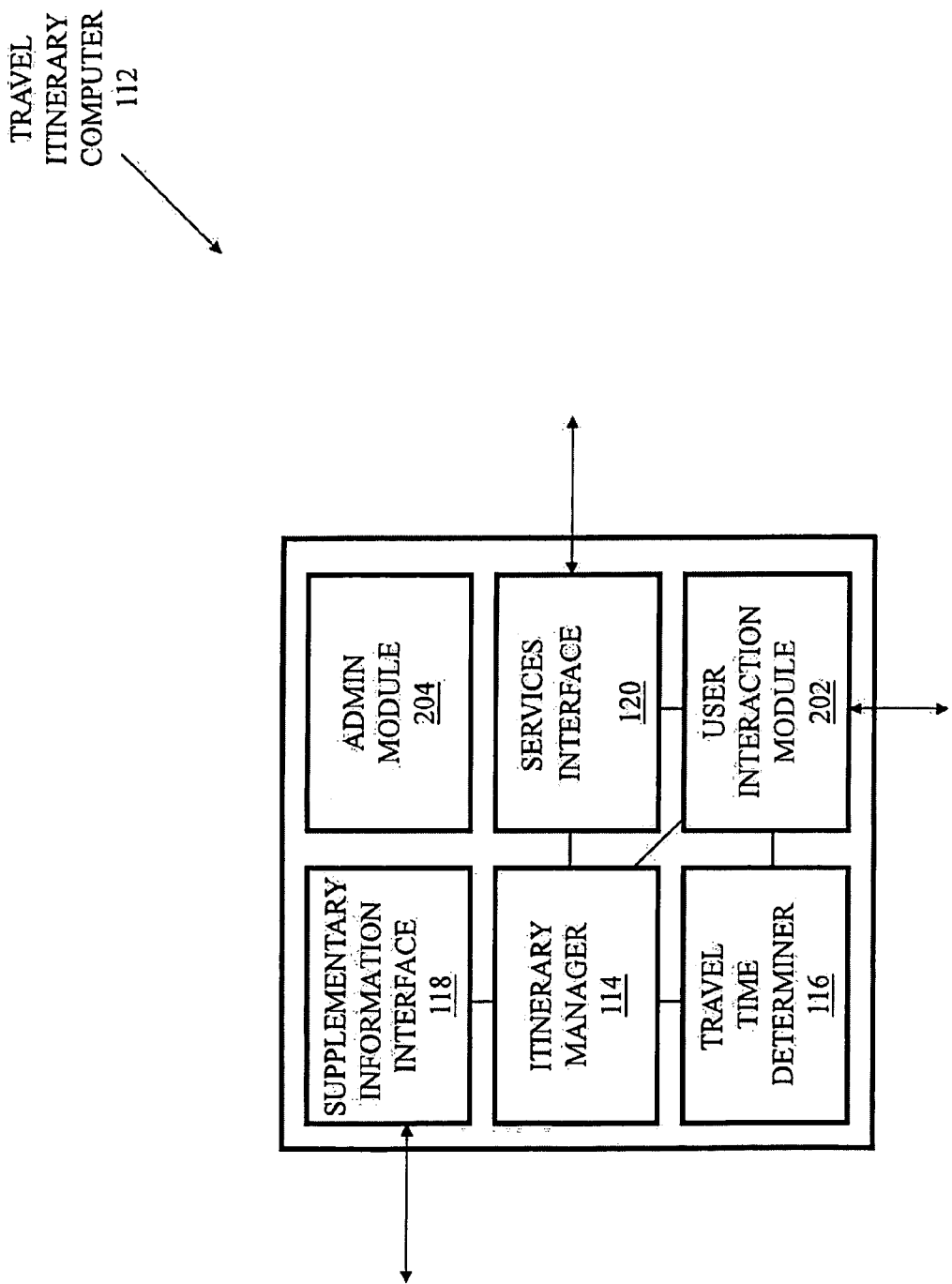
FIG. 2 depicts a travel itinerary computer of the itinerary management system of FIG. 1 according to one embodiment.

FIG. 2 depicts a travel itinerary computer 112 of the itinerary management system of FIG. 1 according to one embodiment. In the depicted embodiment, the travel itinerary computer 112 includes a user interaction module 202, an administration module 204, an itinerary manager 114, a travel time determiner 116, a supplementary information interface 118, and a services interface 120. The itinerary manager 114, travel time determiner 116, supplementary information interface 118, and services interface 120 are described in relation to FIG. 1.

The user interaction module 202 provides, for interaction with the user on the wireless device 102 in one embodiment. The user interaction module 202 may receive communications from the wireless device 102, such as user location information, user preferences, or user responses to inquiries by the travel information computer 112. The user interaction module 202 may also transmit information to the user on the wireless device 102, such as notification of itinerary, changes, notification of service changes, of queries regarding proposed itinerary or service changes. In a further embodiment, the user interaction module 202 may also communicate with third parties in addition to the user, such as third parties designated by the user (for example, a person's assistant, coworker, of spouse). This might be particularly useful if, for example, someone was picking up the user from the airport and the user interaction module 202 could then transmit notifications of any itinerary changes to that third party.

The third party may optionally acknowledge any itinerary changes, after which the acknowledgement may be then forwarded to the user so that the user knows that the third party received the message. In an alternative embodiment, user interaction module 202 may access the user's calendar (on wireless device 102 or in another location) to determine who else might be interested in any changes to the user's itinerary. If a user's spouse, for example, was picking them up from the airport and the calendar entry reflected this, the user interaction module 202 may transmit a notification of the changed itinerary to the spouse as a person on the calendar that might be impacted by the change. Any appropriate type of interaction with users or other may be performed by the user interaction module 202.

The administration module 204 may be in communication with any of the other modules of the travel itinerary computer 112. The administration module 204 may perform any administrative tasks, such as handling user preferences, adding or deleting services computers 126 or supplementary information computers 124, modifying the factors or weight given to factors in the travel time determiner 116, modifying settings in the itinerary manager 114, or adding or deleting users. Any appropriate type of task may be handled by the administrative module 204 and access may optionally be limited to administrators with sufficient permissions.

Figure 3:
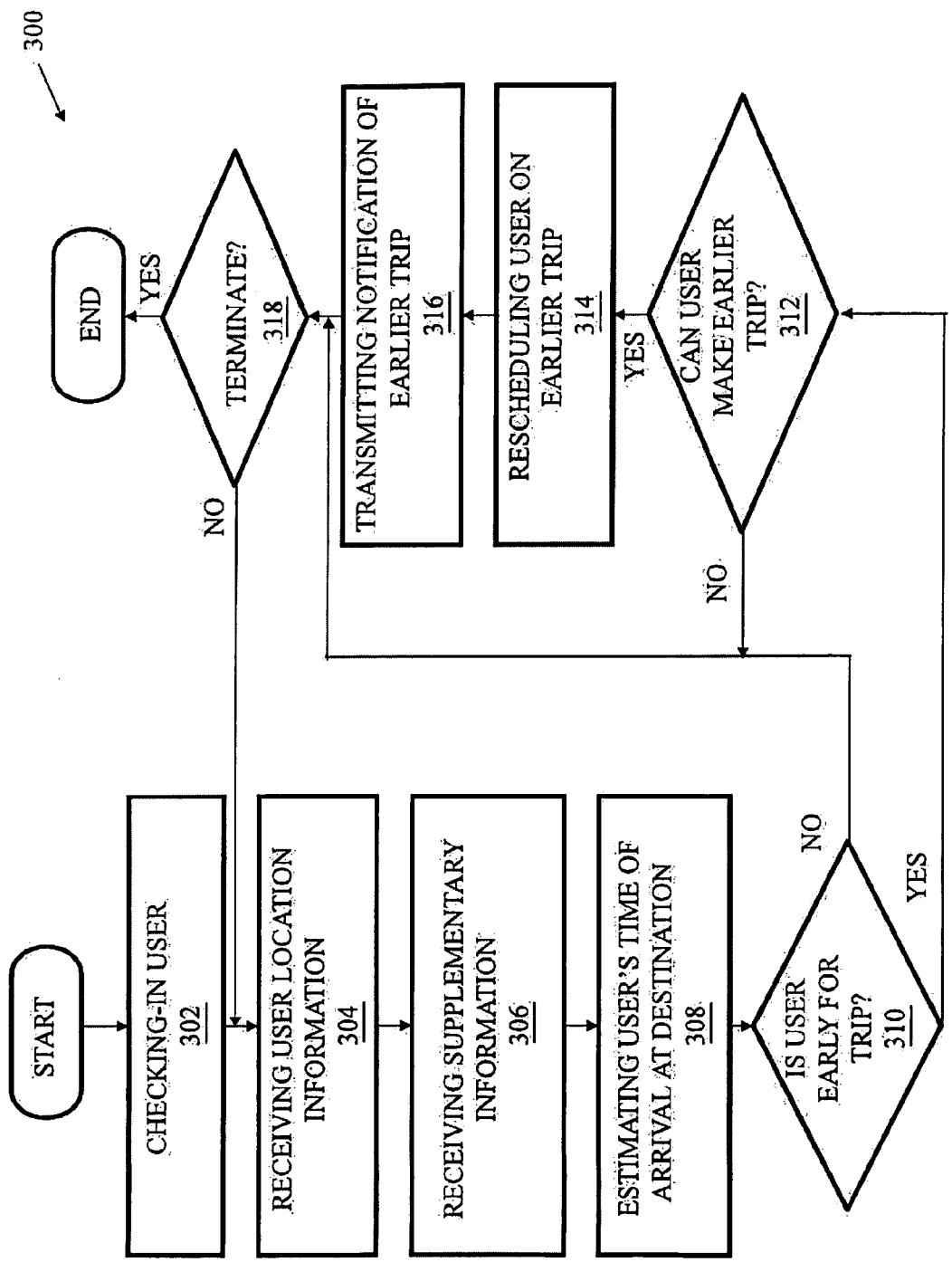
FIG. 3 depicts an example of a flow chart for managing a travel itinerary of a user when a user is early for her trip according to one embodiment.

FIG. 3 depicts an example of a flow chart for managing a travel itinerary of a user when a user is early for her trip according to one embodiment. The elements of method of flow chart 300 may be performed by the travel itinerary computer 112 or by other systems, such as systems managed by a common carrier (airline, bus line, train line, and the like) or other travel entity (such as a travel agency). At element 302, the travel itinerary Computer 112 or other system checks-in the user for a trip. Being 'checked-in' to a trip implies that the user has a reservation on that trip. The user may receive an assigned seat or location as part of her check-in. In an alternative embodiment, element 302 is unnecessary and the travel itinerary computer 112 need only receive an indication of the user's current reservation or trip information.

After the user has scheduled trip, the travel itinerary computer 112 may receive user location information from the user on a wireless device 102 in element 304. A location determining device 106 may determine the user's location for ultimate transmittal by the wireless device 102 as described in relation to FIG. 1. In an alternative embodiment, the user's location may be determined by the wireless network 108 (by utilizing, for example, signal strength, AOA, TOA, U-TDOA, CID, E-CID, or multipath profile techniques) and forwarded to the travel itinerary computer 108. At optional element 306, the travel itinerary computer 112 may receive supplementary information from a supplementary information computer 124. Alternatively, the travel itinerary computer 112 may generate supplementary information itself. As described in relation to FIG. 1, supplementary information may include real-time or historical conditions relating to traffic, airport conditions, weather conditions, security lines, etc.

At element 308, the travel time determiner 116 of the travel itinerary computer 112 may estimate the user's, time of arrival at her destination. The destination of the user for which the estimation is based is typically where the user must be to start her trip, such as an airline gate at an airport or a particular track at a train station. The travel time determiner 116 may estimate the user's time of arrival may be estimated based on a number of factors, including the user's location and any supplementary information received. The factors may also include factors inside the travel destination (e.g., airport) or outside the travel destination (e.g., highway traffic). For example, a user who is 20 miles from the airport might have an estimate of 30 minutes for the drive based on current conditions 10 minutes for parking, 10 minutes for check-in, 15 minutes for security based on current conditions, and 20 minutes to get to her gate for a total estimate of an hour and 25 minutes to get from her current location to her gate.

At decision block 310, the travel itinerary computer 112 determines whether the user will be substantially early for her trip based on the estimated travel time calculated in element 308. If the user will not be substantially early, the method continues to decision block 318. If the travel itinerary computer 112 determines that the user will not be substantially early for their scheduled trip, the travel itinerary computer 112 then determines whether to terminate the process at decision block 318. If the travel itinerary computer 112 determines that the user will likely be substantially early at decision block 310, the travel itinerary computer 112 will then determine whether the user will be able to make an earlier trip at decision block 312. In order to determine whether the user has enough time to make an earlier trip, the travel itinerary computer 112 may consider the departure time of that trip and an estimate of how long the user would need to travel to the place to start that trip. If a user is, for example, one hour early for her scheduled trip, a trip 30 minutes earlier than that one can be taken if the user would only need a few minutes to get to the gate or other start point for that trip. If it would take 25 minutes to get to that gate, it would be difficult for the user to make the switch. The travel itinerary computer 112 may utilize any appropriate methodology similar to that of element 308 to estimate the time to arrive at the destination associated with the beginning of the proposed new trip. If the travel itinerary computer 112 determines that the user cannot make the earlier trip at decision block 312, the travel itinerary computer 112 then determines whether to terminate the process at decision block 318. If the user can make the earlier trip, the travel itinerary computer 112 continues to element 314.

In element 314, the travel itinerary computer 112 reschedules the user on the earlier trip chosen at decision block 312. In one embodiment, the travel itinerary computer 112 changes the user's itinerary directly by booking the user on the new trip and taking them off of the old trip. In another embodiment, the travel itinerary computer 112 may send a request to another system, such as an airline system or services computer 126, to reschedule the user's trip. Any appropriate methodology for rescheduling the user may be used. At element 316, the travel itinerary computer 112 may notify the user that her itinerary has changed so that, she may redirect her travel, if necessary. Instructions to the user on where to go may also be included. In a further embodiment, the travel itinerary computer 112 may also notify third parties, such as contacts designated by the user, in addition to the user.

At decision block 318, the travel itinerary computer 112 determines whether the process should be terminated. The travel itinerary computer 112 may consider any type of factor or criteria, such as the user's location, time, or flight status, in its determination. In one example, the travel itinerary computer 112 may terminate the process when the user boards an aircraft for her flight. In another example, travel itinerary computer 112 may terminate the process after a user has been rescheduled once (or other predetermined amount of times). In yet another example, the travel itinerary computer 112 may terminate the process when the departure time for the user's trip is within a defined amount of time (within 20 minutes of her flight). If the process is hot terminated, the travel itinerary computer 112 continues to element 304 for continued monitoring of the user's location and status.

Figure 4:
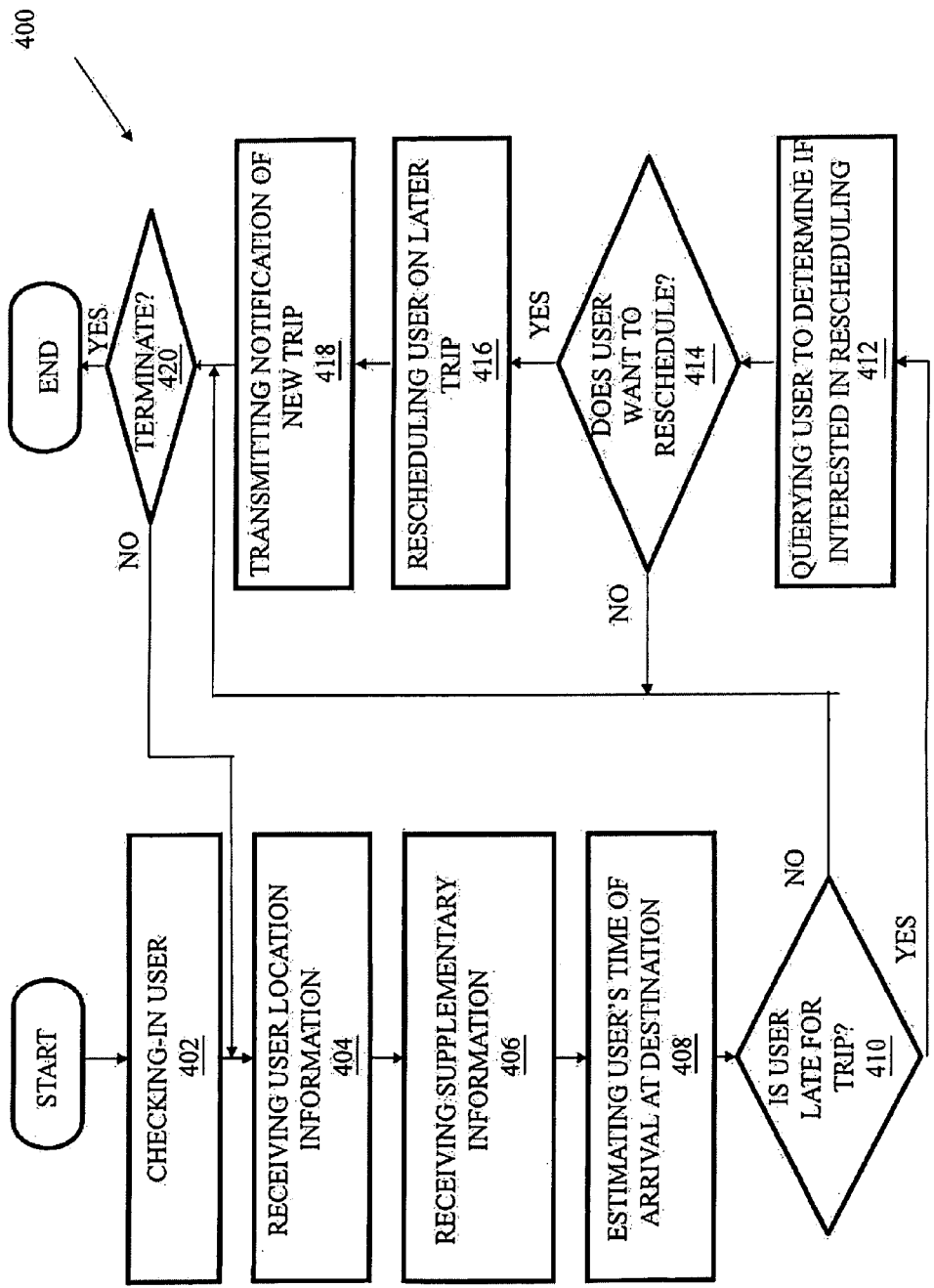
FIG. 4 depicts an example of a flow chart for managing a travel itinerary of a user when a user is late for her trip according to one embodiment.

FIG. 4 depicts an example of a flow chart for managing a travel itinerary of a user when a user is late for her trip according to one embodiment. The method of flow chart 400 may be performed by the travel itinerary computer 112 or other computer system. Flow chart 400 begins with elements 402, 404, 406, and 408, which are substantially similar to the similarly numbered elements of the method of flow chart 300. At decision block 410, the travel itinerary computer 112 may determine whether the user will be late for her trip based on the estimated travel time calculated at element 408. If the travel itinerary computer 112 determines that the user will not be late based on the estimate, the travel itinerary computer 112 continues to decision block 420. If the travel itinerary computer 112 determines that the user will likely be late, the travel itinerary computer 112 continues to optional element 412, querying the user to determine if the user is interested in rescheduling her trip. In this element, travel itinerary computer 112 may send a message to the user on her wireless device 102 informing her that she will be late and asking if she would like to reschedule. Her response may then be transmitted back by the wireless device 102 to the travel itinerary computer 112. This optional element may also be useful in other embodiments, such as that of flow chart 300 of FIG. 3, where the user may be queried before changing her trip to an earlier brie.

Upon receiving the user's response, the travel itinerary computer 112 determines whether the user wants to reschedule at decision block 414. If the user does not want to reschedule, the travel itinerary computer 112 continues to decision block 420 where it determines whether to terminate the process. If the user does want to reschedule, the travel itinerary computer 112 continues to element 416, rescheduling the user on a later trip. At element 416, the travel itinerary computer 112 may change the user's itinerary directly by booking her on the new trip and taking her off of the old trip. In another embodiment, the travel itinerary computer 112 may send a request to another system, such as an airline system or services computer 126, to reschedule the user's trip. Any methodology for rescheduling the user may be used. At element 418, the travel itinerary computer 112 may notify the user (and any third parties) that her itinerary has changed so that she may redirect her travel, if necessary.

At decision block 420, the travel itinerary computer 112 determines whether the process should be terminated. The decision may be based on any type of factor or criteria, such as the user's location, time, flight status, or the like. Decision block 420 may be substantially similar to that of decision block 318 of FIG. 3. If the process is not terminated in decision block 420, the travel itinerary computer 112 continues to element 404 for continued monitoring of the user location and status.

Figure 5:
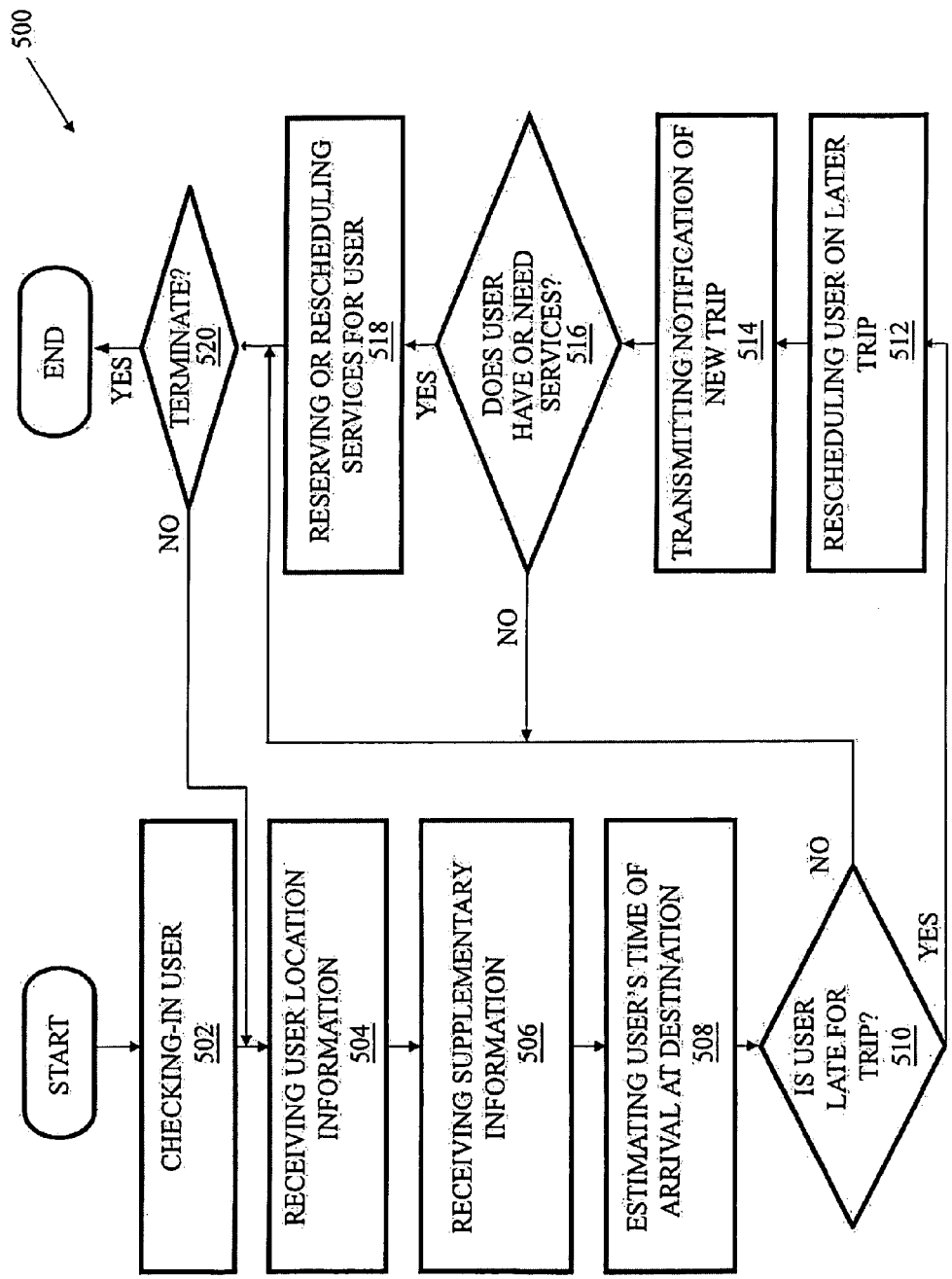
FIG. 5 depicts an example of a flow chart for managing a travel itinerary of a user when a user is late for her trip according to an alternative embodiment.

FIG. 5 depicts an example of a flow chart for managing a travel itinerary of a user when a user is late for her trip according to an alternative embodiment. The method of flow chart 500 may be performed, in one embodiment, by the travel itinerary computer 112. Flow chart 500 begins with elements 502, 504, 506, and 508, which are substantially similar to the similarly numbered elements of the method of flow chart 300.

At decision block 510, the travel itinerary computer 112 may determine whether the user will be late for her trip based on the estimated travel time calculated in element 508. If the user will not be late based on the estimate, the travel itinerary computer 112 continues to decision block 520. If the user will likely be late, the method of flow chart 500 continues to optional element 512, rescheduling the user on a later trip. At element 512, the travel itinerary computer 112 may reschedule the user by changing the user's itinerary directly by booking her on the new trip and taking her off of the old trip. Alternatively, the travel itinerary computer 112 may send a request to another system, such as an airline system or services computer 126, to reschedule the user's trip. Any appropriate methodology for rescheduling the user may be used. The travel itinerary computer 112 may then transmit notification of the new trip to the user on a wireless device 102 (and any third parties) at element 514 so that she may redirect her travel, if necessary.

After a new trip has been scheduled, the travel itinerary computer 112 determines whether the user has scheduled services that need to be changed or needs news services because of the new itinerary at decision block 516. The travel itinerary computer 112 may base the determination on the results of querying the user regarding services or other factors, such as how much the itinerary has changed, whether an overnight stay is necessary, or the like. If, for example, a user will miss the last flight of the day and will be rescheduled for the first flight the next morning, the travel itinerary computer 112 may determine that the user needs hotel arrangements near the airport. If the travel itinerary computer 112 determines that the user does not need services or does not need to change services, the travel itinerary computer 112 continues to decision block 520. If the travel itinerary computer 112 determines that services should be modified, the travel itinerary computer 112 continues to element 518, reserving or rescheduling services for the user. At this element, the travel itinerary computer 112, one or more services computers 126, or any other computer systems may reserve (or modify existing reservations) based on the user's new itinerary. For example, a services computer 126 maintained by a hotel provider may reserve a room for the user based on instructions from the travel itinerary computer 112. Modification of services, as described in relation to elements 516 and 518, may also be suitable for other embodiments, such as those described in relation to FIGS. 3 and 4.

At decision block 520, the travel itinerary server 112 determines whether the process should be terminated. The travel itinerary server 112 may base its determination on any type of factor or criteria, such as the user's location, time, flight status, or the like. Decision block 520 may be substantially similar to that of decision block 318 of FIG. 3. If the process is not terminated in decision block 520, the travel itinerary server 112 may continue to element 504 for continued monitoring of the user's location and status.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for managing the travel itinerary of a user. It is understood that the form of the invention shown and described in the detailed description and the drawings are to be taken merely as examples. It is intended that the following claims be interpreted broadly to embrace all the variations of the example embodiments disclosed.

What is claimed is:

1. A method for managing a travel itinerary for a user on a wireless device connected to a wireless network, the method comprising:

receiving, by a travel itinerary computer, user location information from the user on the wireless device, the user location information providing an indication of the location of the user;

estimating, by the travel itinerary computer, the arrival time of the user at a destination based on the user location information, wherein the destination is a departure point for a first scheduled trip of the user on a first vehicle departing the departure point at approximately the departure time;

comparing, by the travel itinerary computer, the estimated arrival time of the user with a departure time for the first scheduled trip;

determining, by the travel itinerary computer, that the arrival time is substantially earlier than the departure time; and rescheduling, by the travel itinerary computer in response to determining that the arrival time is substantially earlier than the departure time, the user for a second scheduled trip that is scheduled to depart prior to the first scheduled trip on a second vehicle departing the same or a different departure point at a second departure time prior to the first departure time, wherein rescheduling comprises:

automatically obtaining a reservation for occupying a portion of the second vehicle through a reservation system;

releasing the user's reservation on the first vehicle in response to rescheduling the user for the second scheduled trip;

generating an estimated time of arrival of the user at the second departure point; and determining that the estimated time of arrival of the user at the second departure point is sufficiently prior to the second departure time, wherein automatically obtaining a reservation for occupying a portion of the second vehicle and releasing the user reservation on the first vehicle are performed in response to the determination that the estimated time of arrival of the user at the second departure point is sufficiently prior to the second departure time.

2. The method of claim 1, further comprising:

receiving, by the travel itinerary computer, supplementary information from a supplementary information computer; and wherein the estimating step comprises estimating, by the travel itinerary computer, the arrival time of the user at the destination based on the user location information and the supplementary information.

3. The method of claim 2, wherein the supplementary information comprises information identifying at least one of security line delays at the departure point, check-in time delay at the departure point, or luggage check-in delays at the departure point.

4. The method of claim 1, further comprising:

transmitting, by the travel itinerary computer, a notification that the user has been rescheduled to the second scheduled trip to a third party device;

receiving an acknowledgment, from a third party using the third party device, acknowledging receipt of the notification that the user has been rescheduled to the second scheduled trip; and outputting a notification to the user indicating that the third party has acknowledged receipt of the notification.

5. The method of claim 4, further comprising:

accessing, by the travel itinerary computer, an electronic calendar associated with the user to identify one or more entries corresponding to the first scheduled trip; and identifying the third party based on information stored in the one or more entries of the electronic calendar, wherein the transmitting of the notification to the third party device is performed in response to the identification of the third party from the one or more entries of the electronic calendar.

6. The method of claim 1, further comprising rescheduling services, by one of the travel itinerary computer or a services computer, based on the second trip.

7. The method of claim 1, further comprising automatically checking-in the user for the second scheduled trip.

8. The method of claim 1, wherein the comparing step comprises comparing the estimated arrival time at the destination with the departure time for the first scheduled trip to determine if the user will be ahead of schedule, behind schedule, or on schedule for the scheduled trip.

9. The method of claim 1, wherein estimating, by the travel itinerary computer, the arrival time of the user at a destination based on the user location information comprises estimating the arrival time based on historical travel time information collected for a plurality of users for traveling from the user's location to the destination.

10. The method of claim 1, wherein estimating, by the travel itinerary computer, the arrival time of the user at a destination based on the user location information comprises estimating the arrival time based on historical travel time information collected for only the user.

11. A non-transitory computer readable medium storing instructions of a computer readable program effective, when executing in a data processing system, to cause said data processing system to perform operations comprising:

receiving, from the computer readable program by a travel itinerary computer, user location information from a user on a wireless device, the user location information providing an indication of the location of the user;

estimating, by the travel itinerary computer, the arrival time of the user at a destination based on the user location information, wherein the destination is a departure point for a first scheduled trip of the user on a first vehicle departing the departure point at approximately the departure time;

comparing, by the travel itinerary computer, the estimated arrival time of the user with a departure time for the first scheduled trip;

determining, by the travel itinerary computer, that the arrival time is substantially earlier than the departure time; and rescheduling, by the travel itinerary computer in response to determining that the arrival time is substantially earlier than the departure time, the user for a second scheduled trip that is scheduled to depart prior to the first scheduled trip on a second vehicle departing the same or a different departure point at a second departure time prior to the first departure time, wherein rescheduling comprises:

automatically obtaining a reservation for occupying a portion of the second vehicle through a reservation system;

releasing the user's reservation on the first vehicle in response to rescheduling the user for the second scheduled trip;

generating an estimated time of arrival of the user at the second departure point; and determining that the estimated time of arrival of the user at the second departure point is sufficiently prior to the second departure time, wherein automatically obtaining a reservation for occupying a portion of the second vehicle and releasing the user reservation on the first vehicle are performed in response to the determination that the estimated time of arrival of the user at the second departure point is sufficiently prior to the second departure time.

12. The non-transitory computer readable medium of claim 11, wherein the computer readable program further causes the data processing system to:
- transmit, by the travel itinerary computer, a notification that the user has been rescheduled to the second scheduled trip to a third party device;
- receive an acknowledgment, from a third party using the third party device, acknowledging receipt of the notification that the user has been rescheduled to the second scheduled trip; and
- output a notification to the user indicating that the third party has acknowledged receipt of the notification.

13. The non-transitory machine-accessible medium of claim 12, wherein the computer readable program further causes the data processing system to:
- access an electronic calendar associated with the user to identify one or more entries corresponding to the first scheduled trip; and
- identify the third party based on information stored in the one or more entries of the electronic calendar, wherein the transmitting of the notification to the third party device is performed in response to the identification of the third party from the one or more entries of the electronic calendar.

14. A data processing system for managing a travel itinerary for a user on a wireless device connected to a wireless network, the system comprising:
- one or more processors; and
- memory, communicatively coupled to the one or more processors;
- wherein the data processing system, which includes the memory, further comprises:
  - a user interaction module, the user interaction module being adapted to receive user location information from the user on the wireless device, wherein the user has a first scheduled trip as part of the travel itinerary;
  - a travel time determiner, the travel time determiner being adapted to estimate the time for the user to travel to a departure point associated with the first scheduled trip based on the user location information, wherein the departure point is a departure point for a first vehicle at approximately a first departure time; and
  - an itinerary manager, the itinerary manager being adapted to determine whether the travel itinerary of the user should be changed based on the estimated time for the user to travel to the departure point, the itinerary manager being further adapted to change the travel itinerary of the user by scheduling a second scheduled trip to replace the first scheduled trip of the user, wherein the second scheduled trip comprises a second vehicle that departs at a second departure time that is earlier than the first departure time from a same or different departure point, wherein the itinerary manager changes the travel itinerary by:
    - automatically obtaining a reservation for occupying a portion of the second vehicle through a reservation system;
    - releasing the user's reservation on the first vehicle in response to rescheduling the user for the second scheduled trip;
    - generating an estimated time of arrival of the user at the second departure point; and
    - determining that the estimated time of arrival of the user at the second departure point is sufficiently prior to the second departure time, wherein automatically obtaining a reservation for occupying a portion of the second vehicle and releasing the user reservation on the first vehicle are performed in response to the determination that the estimated time of arrival of the user at the second departure point is sufficiently prior to the second departure time.

15. The system of claim 14, further comprising a supplementary information interface, the supplementary information interface being adapted to receive supplementary information from a supplementary information computer.

16. The system of claim 14, further comprising a services interface, the services interface being adapted to request changes in scheduled service from a services computer based on the changes in the travel itinerary of the user.

17. The system of claim 14, wherein the user interaction module is further adapted to:
- transmit a notification of the second scheduled trip to a third party device associated with a third party;
- receive an acknowledgment, from the third party using the third party device, acknowledging receipt of the notification that the user has been rescheduled to the second scheduled trip; and
- output a notification to the user indicating that the third party has acknowledged receipt of the notification.

18. The system of claim 14, wherein the travel time determiner estimates the time for the user to travel from the current location to the departure point associated with the first scheduled trip based on supplementary information received from a supplementary information computer.

* * * * *